(12) United States Patent
Kurehashi (10) Patent No.: US 11,100,804 B2
(45) Date of Patent: Aug. 24, 2021

(54) DRIVING ASSISTANCE APPARATUS

(71) Applicant: HONDA MOTOR CO., LTD., Tokyo (JP)

(72) Inventor: Takahiro Kurehashi, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 288 days.

(21) Appl. No.: 16/353,427

(22) Filed: Mar. 14, 2019

(65) Prior Publication Data
US 2019/0287406 A1 Sep. 19, 2019

(30) Foreign Application Priority Data
Mar. 15, 2018 (JP) ............................ JP2018-047411

(51) Int. Cl.
 G08G 1/16 (2006.01)
 G05D 1/02 (2020.01)
 G08G 1/01 (2006.01)

(52) U.S. Cl.
 CPC ........... *G08G 1/166* (2013.01); *G05D 1/0214* (2013.01); *G08G 1/0145* (2013.01); *G05D 2201/0213* (2013.01)

(58) Field of Classification Search
 CPC ...... G08G 1/166; G08G 1/0145; G08G 1/163; G05D 1/0214; G05D 2201/0213; B60W 50/14; B60W 30/0956; B60W 2556/50; B60W 2050/0089; B60W 30/18159; B60W 30/095
 USPC ........................................................... 701/23
 See application file for complete search history.

(56) References Cited

U.S. PATENT DOCUMENTS

| | | | |
|---|---|---|---|
| 6,989,766 B2* | 1/2006 | Mese | G08G 1/096716 340/907 |
| 2004/0122587 A1* | 6/2004 | Kanemitsu | G01S 5/0072 701/300 |
| 2016/0139601 A1* | 5/2016 | Vermillion | G05D 1/0816 244/96 |
| 2016/0155329 A1* | 6/2016 | Goto | H04W 4/40 340/903 |
| 2016/0161271 A1* | 6/2016 | Okumura | G01C 21/34 701/25 |
| 2017/0067385 A1* | 3/2017 | Hunt | B60W 40/09 |
| 2017/0364080 A1* | 12/2017 | Chintakindi | B60R 25/002 |
| 2018/0321693 A1* | 11/2018 | Tu | G05D 1/12 |

FOREIGN PATENT DOCUMENTS

| | | |
|---|---|---|
| JP | 2004-199389 A | 7/2004 |
| JP | 2016-110218 A | 6/2016 |

* cited by examiner

*Primary Examiner* — Jonathan M Dager
*Assistant Examiner* — Jean W Charleston
(74) *Attorney, Agent, or Firm* — Carrier Blackman & Associates, P.C.; Joseph P. Carrier; Jeffrey T. Gedeon (57) ABSTRACT

A driving assistance apparatus includes a trajectory information acquiring unit, an intersection registering unit, and a driving assistance unit. The intersection registering unit registers in a storage unit as a specific intersection, an intersection which a host vehicle passes through after another vehicle has passed through. The driving assistance unit makes a level of driving assistance performed in a predetermined area near the specific intersection higher than the level of driving assistance performed in the predetermined area near another intersection.

5 Claims, 10 Drawing Sheets

| No. | ITEM |
|---|---|
| 1 | INTERSECTION ID |
| 2 | TIME |
| 3 | LATITUDE |
| 4 | LONGITUDE |
| 5 | ALTITUDE |
| 6 | DIRECTION OF ENTRY |

DRIVING ASSISTANCE APPARATUS

CROSS-REFERENCE TO RELATED APPLICATION

This application is based upon and claims the benefit of priority from Japanese Patent Application No. 2018-047411 filed on Mar. 15, 2018, the contents of which are incorporated herein by reference.

BACKGROUND OF THE INVENTION

Field of the Invention

The present invention relates to a driving assistance apparatus that assists the driver of a vehicle without using map information.

Description of the Related Art

Japanese Laid-Open Patent Publication No. 2016-110218 discloses an apparatus that determines whether a host vehicle and another vehicle will encounter at a point of intersection of roads without using map information, and displays a message for intersection collision prevention assistance when it is determined that they will encounter. This apparatus stores travel history information of the individual vehicles, such as their positions and speeds, and sets the point at which the travel trajectories of the two vehicles intersect as a point of intersection based on the travel history information. Then, presuming that a point of intersection at which the host vehicle and the other vehicle will encounter within a predetermined time period is a predicted point of encounter, the apparatus determines a change in the speed of each vehicle near the predicted point of encounter based on their travel history information. When there is any information for which the change in speed exceeds a threshold, the apparatus displays a message on the presumption that the predicted point of encounter is a level crossing or grade intersection. When there is no information for which the change in speed exceeds the threshold, the apparatus does not display a message on the presumption that the predicted point of encounter is a grade separation.

Japanese Laid-Open Patent Publication No. 2004-199389 discloses an apparatus that determines whether there is any other vehicle that can possibly intersect the host vehicle without using map information. This apparatus creates vector mapping data composed of multiple travel vectors based on position and speed information sent from one or more other vehicles, extracts road geometries, and performs determination on intersection between the host vehicle and other vehicle based on the travel vectors of the host vehicle and the other vehicle and on the road geometries.

SUMMARY OF THE INVENTION

The apparatuses of Japanese Laid-Open Patent Publication Nos. 2016-110218 and 2004-199389 perform determination on intersection between the host vehicle and other vehicle without using map information, and perform driving assistance such as presenting a message to the driver of the host vehicle near an intersection. These apparatuses, however, do not assess the relation of priority among the roads at an intersection, so driving assistance is performed from whichever direction the host vehicle enters the intersection. As a result, the driver of the host vehicle can feel frustrated.

The present invention was made in view of such a problem and an object thereof is to provide a driving assistance apparatus that does not cause the driver to feel frustrated.

The present invention provides a driving assistance apparatus including: a trajectory information acquiring unit configured to obtain host-vehicle trajectory information indicative of a host vehicle's traveled trajectory which has been traveled by a host vehicle and other-vehicle trajectory information indicative of another vehicle's traveled trajectory which has been traveled by the other vehicle; an intersection registering unit configured to monitor the host vehicle's traveled trajectory and the other vehicle's traveled trajectory based on the host-vehicle trajectory information and on the other-vehicle trajectory information, and register in a storage unit, position information of an intersection at which the host vehicle's traveled trajectory and the other vehicle's traveled trajectory intersect; and a driving assistance unit configured to perform driving assistance for the host vehicle in a predetermined area near the intersection when the host vehicle is to pass through the intersection registered in the storage unit, wherein the intersection registering unit is configured to register in the storage unit as a specific intersection, an intersection which the host vehicle passes through after the other vehicle has passed through, and the driving assistance unit is configured to make a level of driving assistance performed in the predetermined area near the specific intersection higher than the level of driving assistance performed in the predetermined area near another intersection.

By registering an intersection which the host vehicle passes through after the other vehicle has passed through as the specific intersection as in the above configuration, it becomes possible to determine the relation of priority at the intersection. For example, when the host vehicle is to pass through this intersection after the registration of the intersection, the priority of the travel path which the other vehicle passed through at registration can be determined to be higher than the priority of the travel path which the host vehicle passed through. Then, by varying the level of driving assistance in accordance with the priority of the travel path, the level of driving assistance can be made high when the priority is low and made low when the priority is high. As a result, no more driving assistance than necessary is performed in a situation where the priority is high and driving assistance is not required, preventing the driver from feeling frustrated.

In the present invention, the driving assistance unit may be configured to determine a direction of entry of the host vehicle relative to the specific intersection when the host vehicle passes through the specific intersection after the registration of the specific intersection, and when the determined direction of entry is same as the direction of entry at a time of registration of the specific intersection, the driving assistance unit may be configured to make the level of driving assistance performed in the predetermined area near the specific intersection higher than the level of driving assistance performed in the predetermined area near the other intersection.

By considering the direction of entry at the time of registration and that at the time of driving assistance as in the above configuration, driving assistance can be performed in an appropriate scene.

In the present invention, the intersection registering unit may be configured to calculate a candidate point for the specific intersection based on a travel vector of the host vehicle and on a travel vector of the other vehicle, and identify the candidate point as the specific intersection when the intersection registering unit is configured to presume that both of the host vehicle's traveled trajectory and the other vehicle's traveled trajectory have passed through the candidate point.

Such pre-calculation of a candidate point for the specific intersection as in the above configuration eliminates the necessity to monitor traveled trajectories when there is no candidate point. By not always performing the monitoring of traveled trajectories, processing load can be reduced.

In the present invention, the intersection registering unit may be configured to set a passage zone including the candidate point, and presume that either the host vehicle or the other vehicle has passed through the candidate point if it is determined that either the host vehicle's traveled trajectory or the other vehicle's traveled trajectory has entered and exited the passage zone, and if it is determined that a direction difference between the direction when either the host vehicle or the other vehicle entered the passage zone and the direction when exited the passage zone is equal to or less than a predetermined threshold.

By presuming that the vehicle has passed through the candidate point if the direction difference between the direction when the vehicle entered the passage zone and the direction when it exited the passage zone is equal to or less than the predetermined threshold as in the above configuration, whether the vehicle has passed through the candidate point or not can be determined simply and appropriately.

In the present invention, when an activation of a direction indicator at either the host vehicle or the other vehicle is detected, the intersection registering unit may be configured to make the threshold greater than that when an activation of the direction indicator is not detected.

By making the threshold greater when the direction indicator is activated as in the above configuration, whether the vehicle has passed through the candidate point with a right/left turn can be determined appropriately.

In the present invention, the intersection registering unit may be configured to register in the storage unit as the specific intersection, an intersection which the host vehicle passes through within a predetermined time period after the other vehicle has passed through.

By limiting the elapsed time from when the other vehicle passes through the intersection to when the host vehicle passes through the same to within the predetermined time period as in the above configuration, a scene where the host vehicle gave way to the other vehicle can be extracted correctly. This can increase the reliability of specific intersections to be registered.

With the present invention, no more driving assistance than necessary is performed in a situation where the priority is high and driving assistance is not required, preventing the driver from feeling frustrated.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The driving assistance apparatus according to the present invention is now described in detail by showing preferred embodiments with reference to the accompanying drawings.

[1. Configuration of Driving Assistance Apparatus 10]

Figure 1:
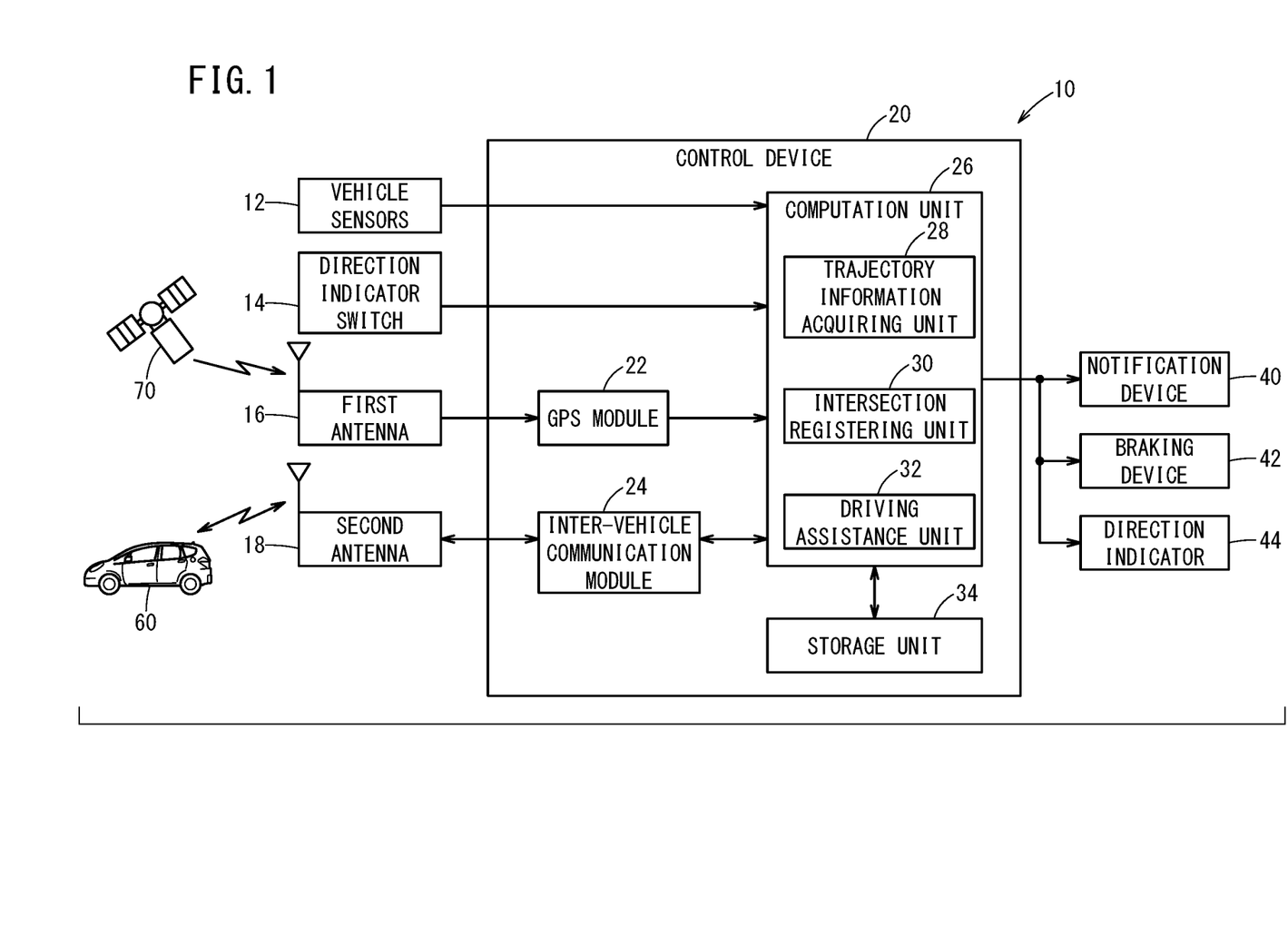
FIG. 1 shows a configuration of a driving assistance apparatus according to an embodiment of the present invention.

A driving assistance apparatus 10 shown in FIG. 1 is mounted on a host vehicle 50 (FIGS. 5 to 8 and 10) driven by a driver. The driving assistance apparatus 10 includes vehicle sensors 12, a direction indicator switch 14, a first antenna 16, a second antenna 18, a control device 20, a notification device 40, a braking device 42, and a direction indicator 44.

The vehicle sensors 12 include sensors necessary for autonomous navigation, such as a gyro sensor and an acceleration sensor, and they also include an altimeter. The vehicle sensors 12 may further include a vehicle speed sensor for obtaining vehicle speed information. The vehicle sensors 12 detect various kinds of information and output the detected information to a computation unit 26 of the control device 20. The direction indicator switch 14 outputs a signal corresponding to the operation of a direction indicator lever provided in the cabin of the host vehicle 50 to the computation unit 26. The first antenna 16 is an antenna used for satellite navigation. The second antenna 18 is an antenna used for inter-vehicle communication between the host vehicle 50 and another vehicle 60.

Figure 2:
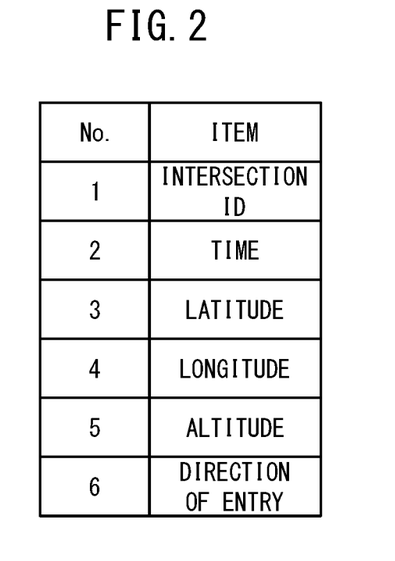
FIG. 2 shows intersection information.

The control device 20 is an electronic control unit (ECU) combining a GPS module 22, an inter-vehicle communication module 24, the computation unit 26, and a storage unit 34. The GPS module 22 is a receiver for receiving radio waves transmitted from an artificial satellite (GPS satellite) 70 via the first antenna 16. The inter-vehicle communication module 24 is a transceiver for receiving radio wave signals transmitted from the other vehicle 60 via the second antenna 18 and for transmitting radio waves to the other vehicle 60 via the second antenna 18. The computation unit 26 is a processor or the like including a CPU and other components. The computation unit 26 carries out various functions by executing the programs stored in the storage unit 34. In this embodiment, the computation unit 26 functions as a trajectory information acquiring unit 28, an intersection registering unit 30, and a driving assistance unit 32. The computation unit 26 receives, as input, various kinds of information from the vehicle sensors 12, the direction indicator switch 14, the GPS module 22, and the inter-vehicle communication module 24, and outputs assistance instructions to the notification device 40 and the braking device 42. The storage unit 34 includes at least ROM as well as a readable and writable storage such as RAM and a hard disk, and stores information about a specific intersection 120*a* (FIGS. 5 to 8, and 10) (hereinafter referred to as intersection information). For example, the storage unit 34 has a database (DB) built therein, in which intersection information such as that shown in FIG. 2 is registered and referenced by the computation unit 26. The storage unit 34 stores various numerical values such as thresholds and predetermined values for use in the intersection registration process and driving assistance process described below.

The notification device 40 includes a notification ECU and information conveying devices (a display device, an audio device, a haptic device, and the like). The notification device 40 provides notification to the driver in accordance with an instruction output by another ECU or the control device 20.

The braking device 42 includes a brake ECU and a brake actuator. The braking device 42 generates braking force in response to a manipulation of a brake pedal by the driver or an instruction output by the control device 20.

The direction indicator 44 blinks in response to a manipulation of the direction indicator switch 14.

[2. Operation of Driving Assistance Apparatus 10]

Figure 5:
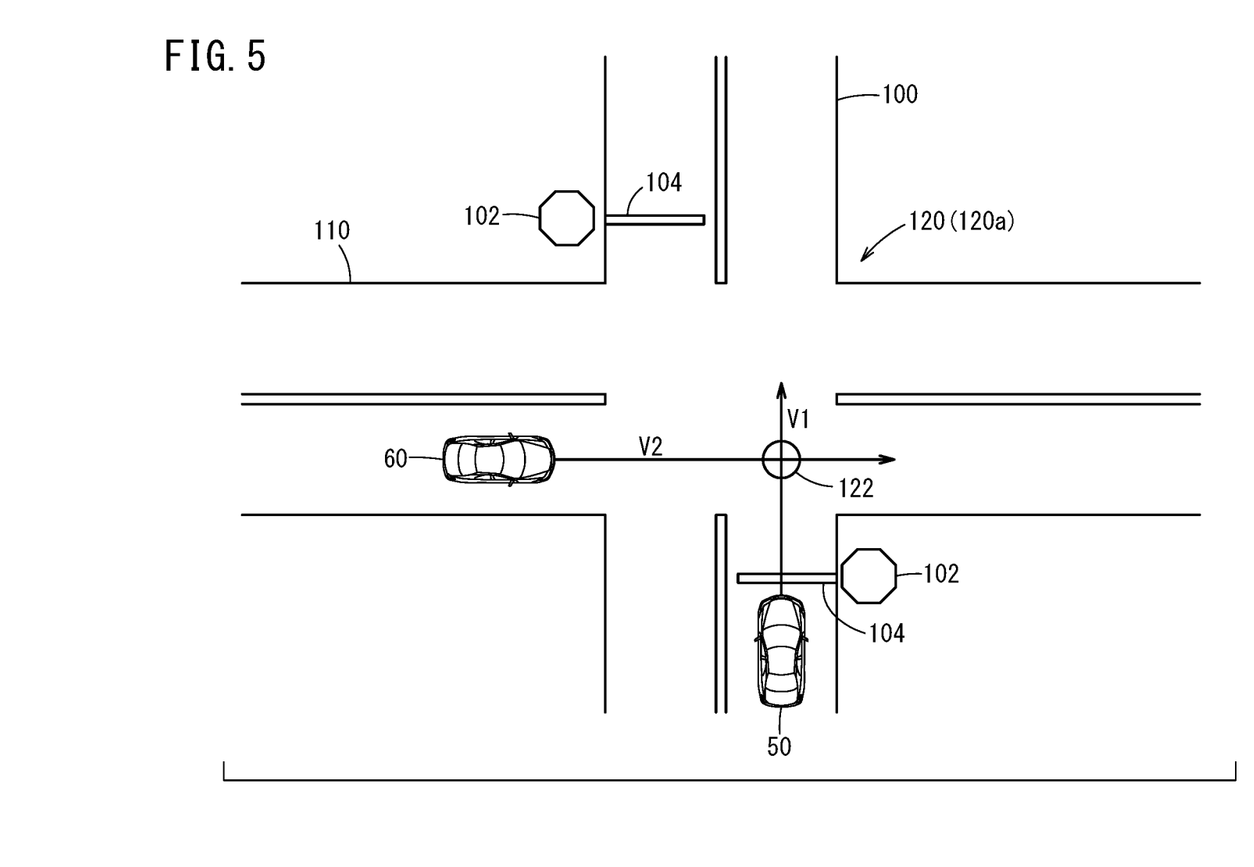
FIG. 5 is an illustration for describing the travel vectors of a host vehicle and another vehicle.

The operation of the driving assistance apparatus 10 is described below. The driving assistance apparatus 10 determines the relation of priority of travel paths based on the behaviors of the host vehicle 50 and the other vehicle 60 at an intersection 120 (FIGS. 5 to 8), and will perform driving assistance, which is a notification to the driver in this embodiment, for the next time the host vehicle 50 passes through the intersection 120 based on the relation of priority. For example, as shown in FIG. 5, in a case where a road sign 102 or a stop line 104 that commands vehicles to stop is present on a first travel path (a lane or road) 100 on which the host vehicle 50 is traveling, the priority of the first travel path 100 is lower than the priority of a second travel path 110 (a lane or road) on which the other vehicle 60 is traveling. Accordingly, when the host vehicle 50 and the other vehicle 60 are to enter the intersection 120 simultaneously, the driver of the host vehicle 50 stops the host vehicle 50 before the intersection 120 and gives way to the other vehicle 60, letting the other vehicle 60 pass first. Based on this behavior, the driving assistance apparatus 10 learns the relation of priority of the first travel path 100 and the second travel path 110.

Figure 3:
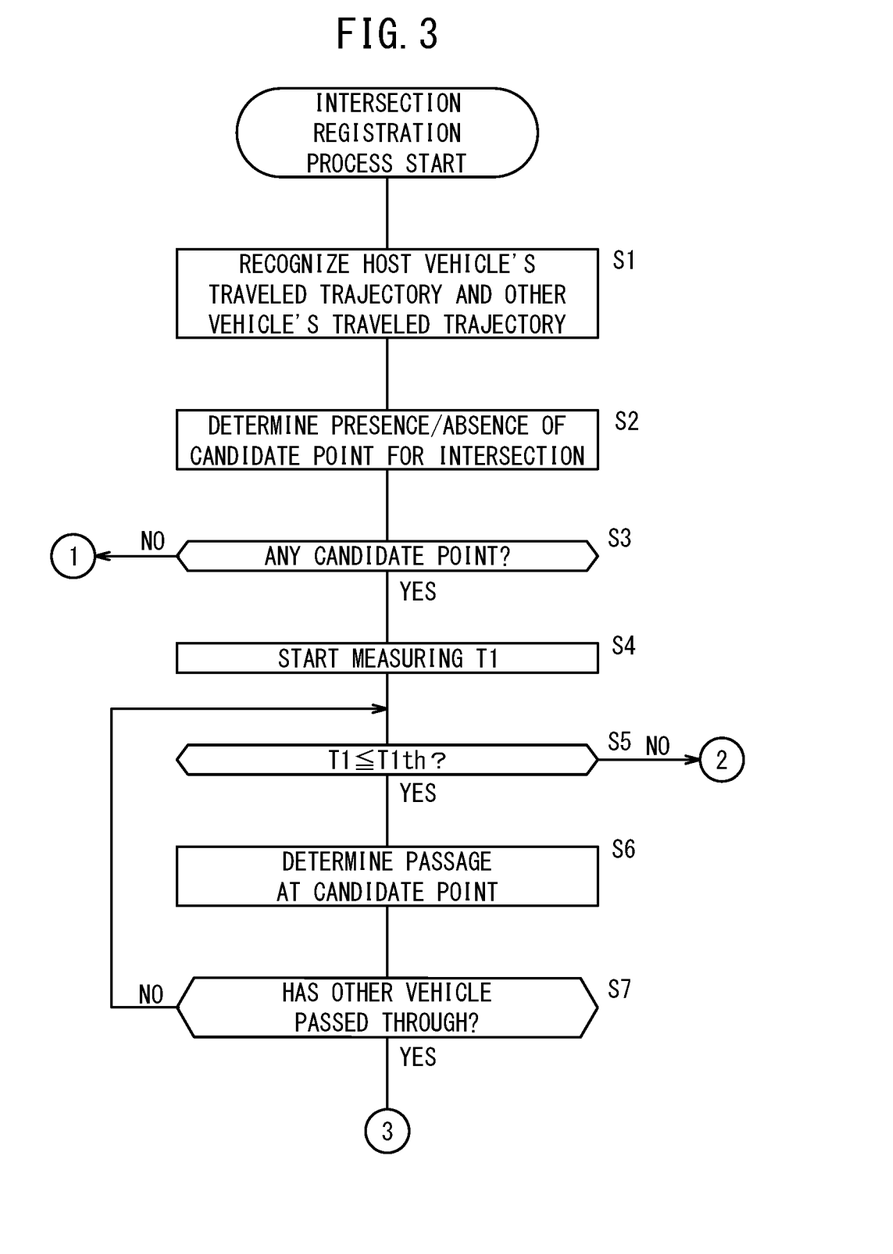
FIG. 3 is a flowchart of an intersection registration process.
Figure 4:
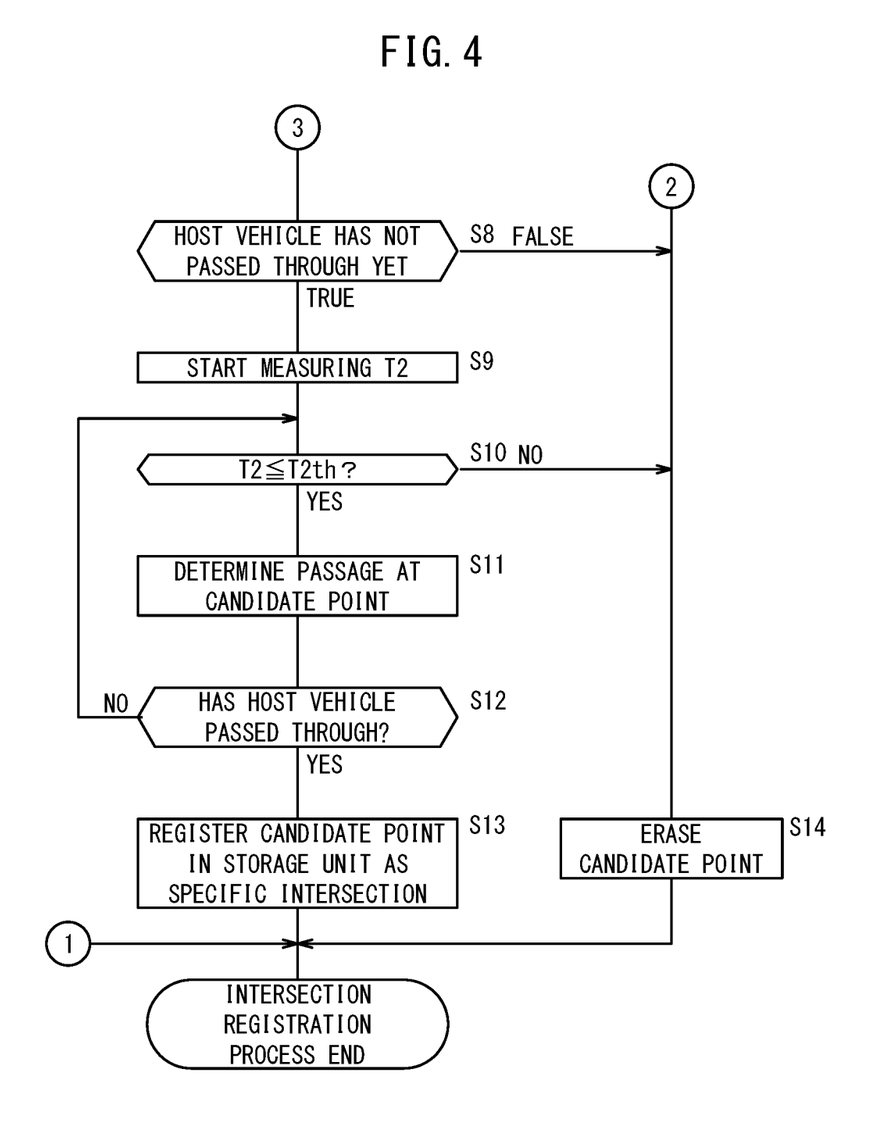
FIG. 4 is a flowchart of the intersection registration process.
Figure 9:
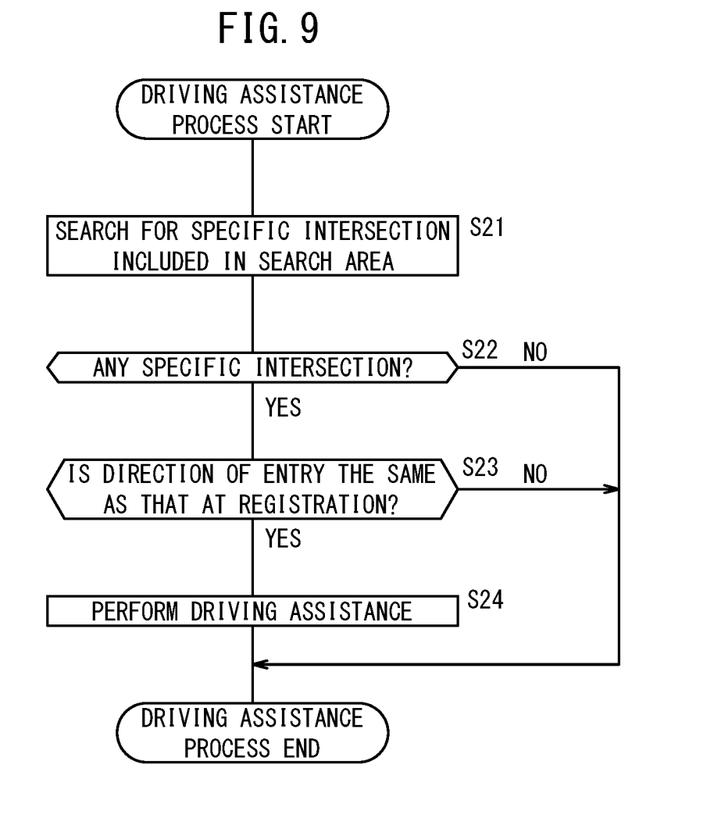
FIG. 9 is a flowchart of a driving assistance process.

The processing performed by the driving assistance apparatus 10 is generally divided into the intersection registration process shown in FIGS. 3 and 4 and the driving assistance process shown in FIG. 9. The intersection registration process and the driving assistance process are each executed at predetermined time intervals while the host vehicle 50 is in operation (while it is powered on).

[2.1. Intersection Registration Process]

Referring to FIG. 3, the intersection registration process is described. The intersection registration process is carried out mainly by the intersection registering unit 30. The intersection registering unit 30 registers the intersection 120 at which the host vehicle 50 gave way to the other vehicle 60, that is, the intersection 120 which the other vehicle 60 passed through before the host vehicle 50 did, in the storage unit 34 as the specific intersection 120*a*. The specific intersection 120*a* is recognized as an intersection 120 where the second travel path 110, which was traveled by the other vehicle 60, has higher priority and the first travel path 100, which was traveled by the host vehicle 50, has lower priority.

At step S1, the trajectory information acquiring unit 28 obtains information output by the vehicle sensors 12 or information output by the GPS module 22, calculates the position of the host vehicle 50, and temporarily stores the position information in the storage unit 34. The trajectory information acquiring unit 28 then recognizes the present (the latest) position of the host vehicle 50 and also recognizes the host vehicle's traveled trajectory that has been traveled by the host vehicle 50 based on time-series information from a predetermined time before to the present time. The trajectory information acquiring unit 28 also obtains the position information of the other vehicle 60 output by the inter-vehicle communication module 24, and temporarily stores the position information in the storage unit 34. The trajectory information acquiring unit 28 then recognizes the present (the latest) position of the other vehicle 60, and also recognizes the other vehicle's traveled trajectory which has been traveled by the other vehicle 60 based on time-series information from the predetermined time before to the present time. The trajectory information acquiring unit 28 also outputs the position information of the host vehicle 50 to the inter-vehicle communication module 24. The inter-vehicle communication module 24 transmits the position information of the host vehicle 50 to other vehicles 60 around via the second antenna 18. In a similar way, the other vehicle 60 transmits the position information of the other vehicle 60 to the host vehicle 50. The processing at step S1 is periodic processing and is performed in parallel during the process described below.

At step S2, the intersection registering unit 30 determines whether there is any candidate point 122 (FIGS. 5 to 8) for the intersection 120 or not in the direction of travel of the host vehicle 50 and the direction of travel of the other vehicle 60. For example, as shown in FIG. 5, the presence or absence of the candidate point 122 is determined by calculating a travel vector V1 of the host vehicle 50 and a travel vector V2 of the other vehicle 60. Each of the travel vectors V1, V2 is shown by a vector including the magnitude of the speed and the direction of travel, where the point of origin is the position being traveled by each vehicle at that moment.

The intersection registering unit 30 recognizes the position, vehicle speed, and direction of travel of the host vehicle 50 at the present time based on information from the trajectory information acquiring unit 28 and from the vehicle sensors 12 (a vehicle speed sensor or an acceleration sensor, and a gyro sensor). Then, based on these pieces of information, the intersection registering unit 30 calculates the travel vector V1 of the host vehicle 50. The intersection registering unit 30 also recognizes the position, vehicle speed, direction of travel of the other vehicle 60 at the present time based on information from the inter-vehicle communication module 24. Then, based on these pieces of information, the intersection registering unit 30 calculates the travel vector V2 of the other vehicle 60. When the travel vector V1 and the travel vector V2 intersect as shown in FIG. 5, the intersection registering unit 30 extracts the point at which the travel vector V1 and the travel vector V2 intersect as the candidate point 122 for the intersection 120. The intersection registering unit 30 then calculates the position of this point (a latitude and a longitude) and temporarily stores the position information in the storage unit 34.

When there is a candidate point 122 for the intersection 120 (step S3: YES), the process proceeds to step S4. On the other hand, when there is no candidate point 122 for the intersection 120 (step S3: NO), the intersection registration process ends once.

When proceeding to step S4 from step S3, the intersection registering unit 30 starts measuring an elapsed time T1 using a timer (not shown). The elapsed time T1 refers to a time that is measured from when the candidate point 122 is extracted to when the other vehicle 60 passes through the candidate point 122.

At step S5, the intersection registering unit 30 compares the elapsed time T1 with a predetermined time period T1th as a threshold. When the elapsed time T1 is equal to or less than the predetermined time period T1th (step S5: YES), the process proceeds to step S6. On the other hand, when the elapsed time T1 exceeds the predetermined time period T1th (step S5: NO), that is, if the other vehicle 60 does not pass through the candidate point 122 within the predetermined time period T1th, the process proceeds to step S14 in FIG. 4.

When proceeding to step S6 from step S5, the intersection registering unit 30 determines whether the host vehicle 50 and the other vehicle 60 have passed through the candidate point 122 or not. The details of the passage determination performed here are described below in [2.2]. If the other vehicle 60 has passed through the candidate point 122 (step S7: YES), the process proceeds to step S8 in FIG. 4. At this point, the intersection registering unit 30 initializes the timer. On the other hand, if the other vehicle 60 has not passed through the candidate point 122 (step S7: NO), the process returns to step S5.

When proceeding to step S8 in FIG. 4 from step S7 in FIG. 3, the intersection registering unit 30 determines whether the host vehicle 50 has not passed through the candidate point 122 yet at the point when the other vehicle 60 has passed through the candidate point 122. If the host vehicle 50 has not passed through the candidate point 122 yet (step S8: TRUE), the process proceeds to step S9. On the other hand, if the host vehicle 50 has already passed through the candidate point 122 (step S8: FALSE), the process proceeds to step S14.

When proceeding to step S9 from step S8, the intersection registering unit 30 starts measuring an elapsed time T2 using the timer. The elapsed time T2 refers to a time that is measured from when the other vehicle 60 passes through the candidate point 122 to when the host vehicle 50 passes through the candidate point 122.

At step S10, the intersection registering unit 30 compares the elapsed time T2 with a predetermined time period T2th as a threshold. When the elapsed time T2 is equal to or less than the predetermined time period T2th (step S10: YES), the process proceeds to step S11. On the other hand, when the elapsed time T2 exceeds the predetermined time period T2th (step S10: NO), that is, if the host vehicle 50 does not pass through the candidate point 122 within the predetermined time period T2th, the process proceeds to step S14.

When proceeding to step S11 from step S10, the intersection registering unit 30 determines whether the host vehicle 50 has passed through the candidate point 122 or not in a similar manner to step S6. The details of the passage determination performed here are described below in [2.2]. If the host vehicle 50 has passed through the candidate point 122 (step S12: YES), the process proceeds to step S13. On the other hand, if the host vehicle 50 has not passed through the candidate point 122 (step S12: NO), the process returns to step S10.

When proceeding to step S13 from step S12, the intersection registering unit 30 registers the candidate point 122 in the storage unit 34 as the specific intersection 120a. Specifically, the various kinds of information shown in FIG. 2, here, intersection ID, time, latitude, longitude, altitude, and direction of entry, are registered in association with one another as intersection information. For the intersection ID, an ID of interest is registered. For the time, a system date is registered. For the latitude, the longitude and the altitude, position information calculated by the trajectory information acquiring unit 28 is registered. For the direction of entry A, the direction from which the host vehicle 50 entered relative to the specific intersection 120a is registered based on information output by the gyro sensor or the GPS module 22.

Meanwhile, when proceeding to step S14 from step S5, S8, or S10, the intersection registering unit 30 erases the position information of the candidate point 122 that was temporarily stored in the storage unit 34 at step S2.

[2.2. Passage Determination]

The passage determination performed at step S6 in FIG. 3 is now described.

(1) A First Passage Determination Method for Host Vehicle 50 and Other Vehicle 60

Figure 6:
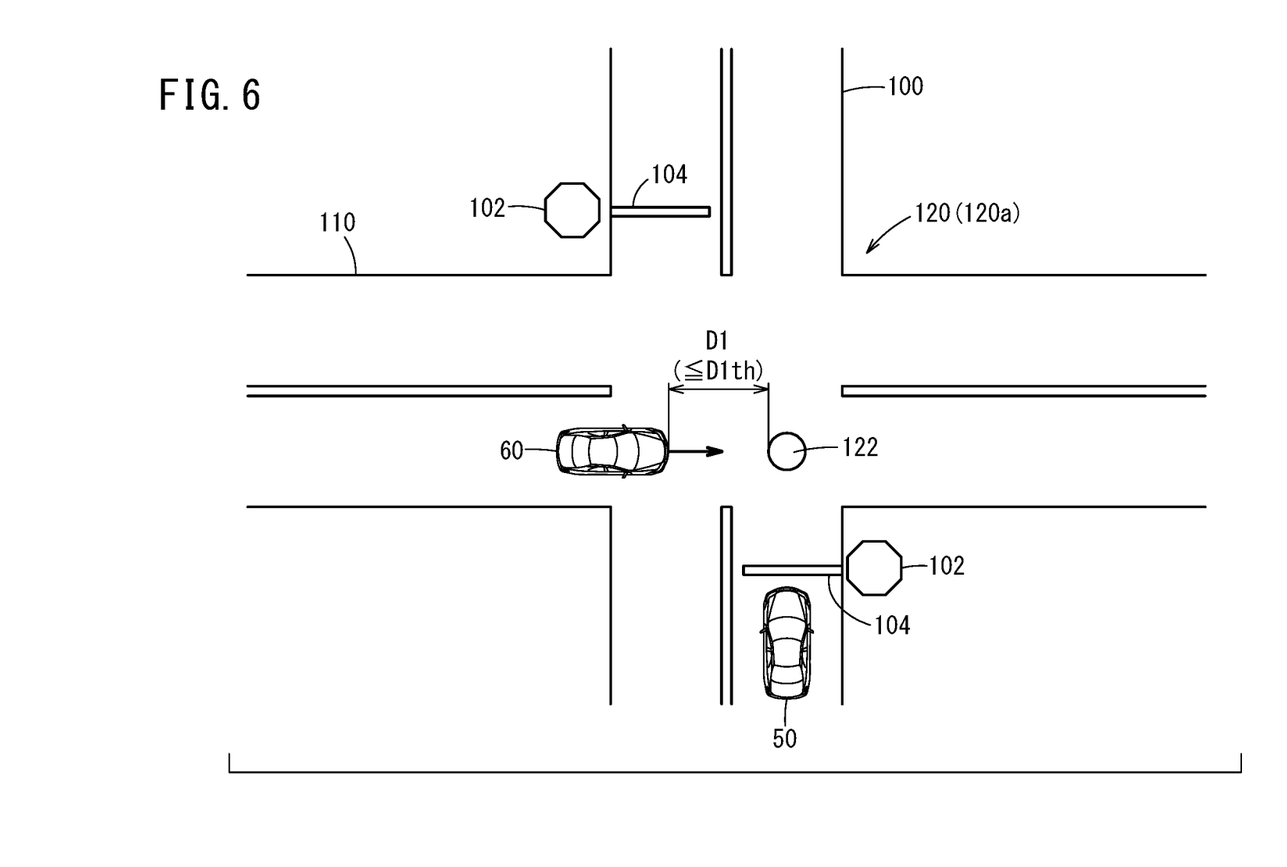
FIG. 6 is an illustration for describing a first passage determination method for the host vehicle and the other vehicle.

Referring to FIG. 6, a first passage determination method is described. Here, a method for determining whether the other vehicle 60 has passed through the candidate point 122 or not is described. The intersection registering unit 30 obtains information on the operation of the other vehicle 60 through inter-vehicle communication. The intersection registering unit 30 monitors the other vehicle's traveled trajectory and also monitors a distance D1 between the other vehicle 60 and the candidate point 122. Then, when the other vehicle 60 has come within a predetermined distance D1th or less of the candidate point 122, that is, when D1≤D1th, the intersection registering unit 30 presumes that the other vehicle 60 has passed through the candidate point 122. Determination can be made in a similar manner for the host vehicle 50.

(2) A Second Passage Determination Method for Host Vehicle 50 and Other Vehicle 60

Figure 7:
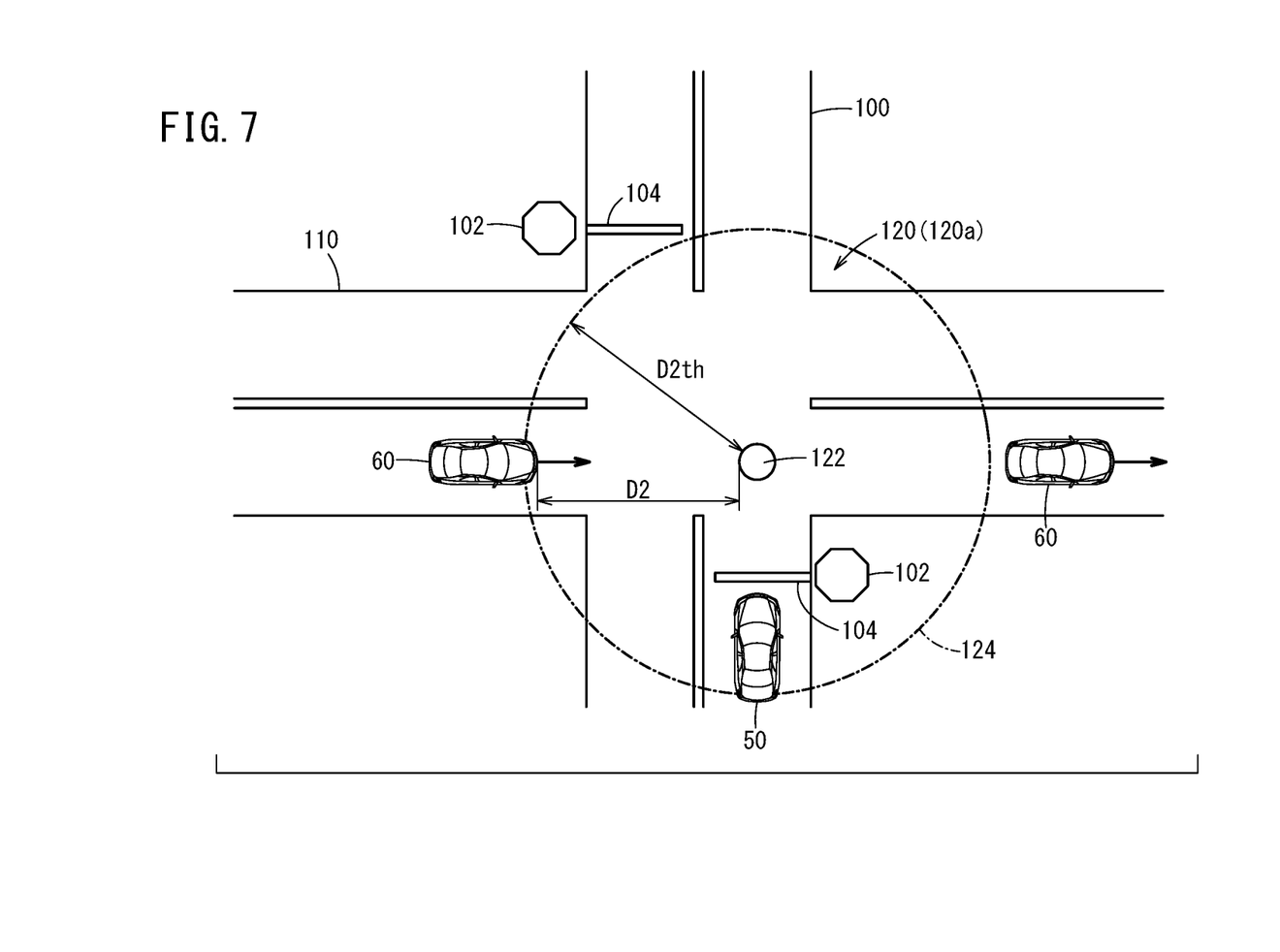
FIG. 7 is an illustration for describing of a second passage determination method for the host vehicle and the other vehicle.

Referring to FIG. 7, a second passage determination method is described. Here, a method for determining whether the other vehicle 60 has passed through the candidate point 122 or not is described. The intersection registering unit 30 obtains information on the operation of the other vehicle 60 through inter-vehicle communication. The intersection registering unit 30 sets a passage zone 124 having a radius D2th and centered at the candidate point 122, and monitors the other vehicle's traveled trajectory. The intersection registering unit 30 presumes that the other vehicle 60 has passed through the candidate point 122 if the other vehicle's traveled trajectory has entered the passage zone 124 and then exited the passage zone 124. Determination can be made in a similar manner for the host vehicle 50.

The second passage determination method may also be replaced with the following method. The intersection registering unit 30 monitors a distance D2 between the other vehicle 60 and the candidate point 122. Then, when the other vehicle 60 has come within a predetermined distance D2th or less of the candidate point 122 and then moved away from it by a distance greater than the predetermined distance D2th, that is, if D2≤D2th is followed by D2>D2th, the intersection registering unit 30 presumes that the other vehicle 60 has passed through the candidate point 122. Determination can be made in a similar manner for the host vehicle 50.

(3) A Third Passage Determination Method for Host Vehicle 50 and Other Vehicle 60

Figure 8:
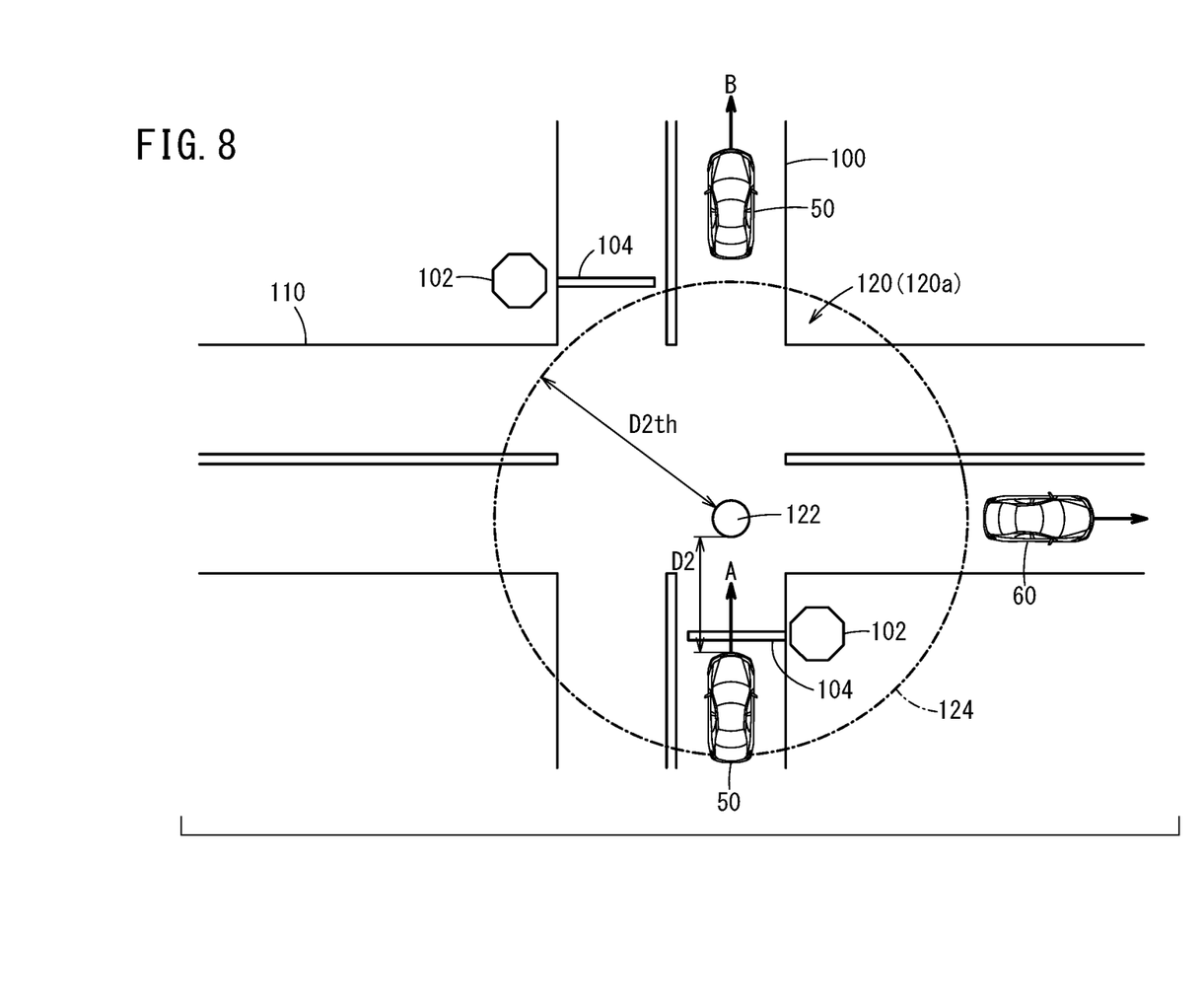
FIG. 8 is an illustration for describing of a third passage determination method for the host vehicle and the other vehicle.

Referring to FIG. 8, a third passage determination method is described. Here, a method for determining whether the host vehicle 50 has passed through the candidate point 122 or not is described. The intersection registering unit 30 sets the passage zone 124 having the radius D2th and centered at the candidate point 122, and monitors the host vehicle's traveled trajectory. When the host vehicle's traveled trajectory has entered the passage zone 124 and then exited the passage zone 124, the intersection registering unit 30 calculates the absolute value |θ1| of the difference θ1 between the direction of entry A in which the host vehicle 50 entered the passage zone 124 and a direction of exit B in which the host vehicle 50 exited the passage zone 124 (hereinafter referred to as direction difference θ1). Then, when the absolute value |θ1| of the direction difference θ1 is equal to or less than a predetermined threshold θ1th, it presumes that the host vehicle 50 has passed through the candidate point 122.

In a case where the host vehicle 50 makes a right/left turn at the intersection 120, the direction difference θ1 will be large. When the host vehicle 50 makes a right/left turn, the driver activates the direction indicator 44. Accordingly, when a signal from the direction indicator switch 14 is detected, the intersection registering unit 30 adds a predetermined angle θ1' (for example, θ1'=90 degrees) to the threshold θ1th to calculate a corrected threshold θ1th+θ1'. Then, if the absolute value |θ1| of the direction difference θ1 is equal to or less than a predetermined corrected threshold θ1th+θ1', the intersection registering unit 30 presumes that the host vehicle 50 has passed through the candidate point 122. Determination can be made in a similar manner for the other vehicle 60.

[2.3. Driving Assistance Process]

Referring to FIG. 9, the driving assistance process is described. The driving assistance process is carried out mainly by the driving assistance unit 32. The driving assistance unit 32 performs driving assistance when the host vehicle 50 enters the specific intersection 120a in the same direction as that at the time of registration.

Figure 10:
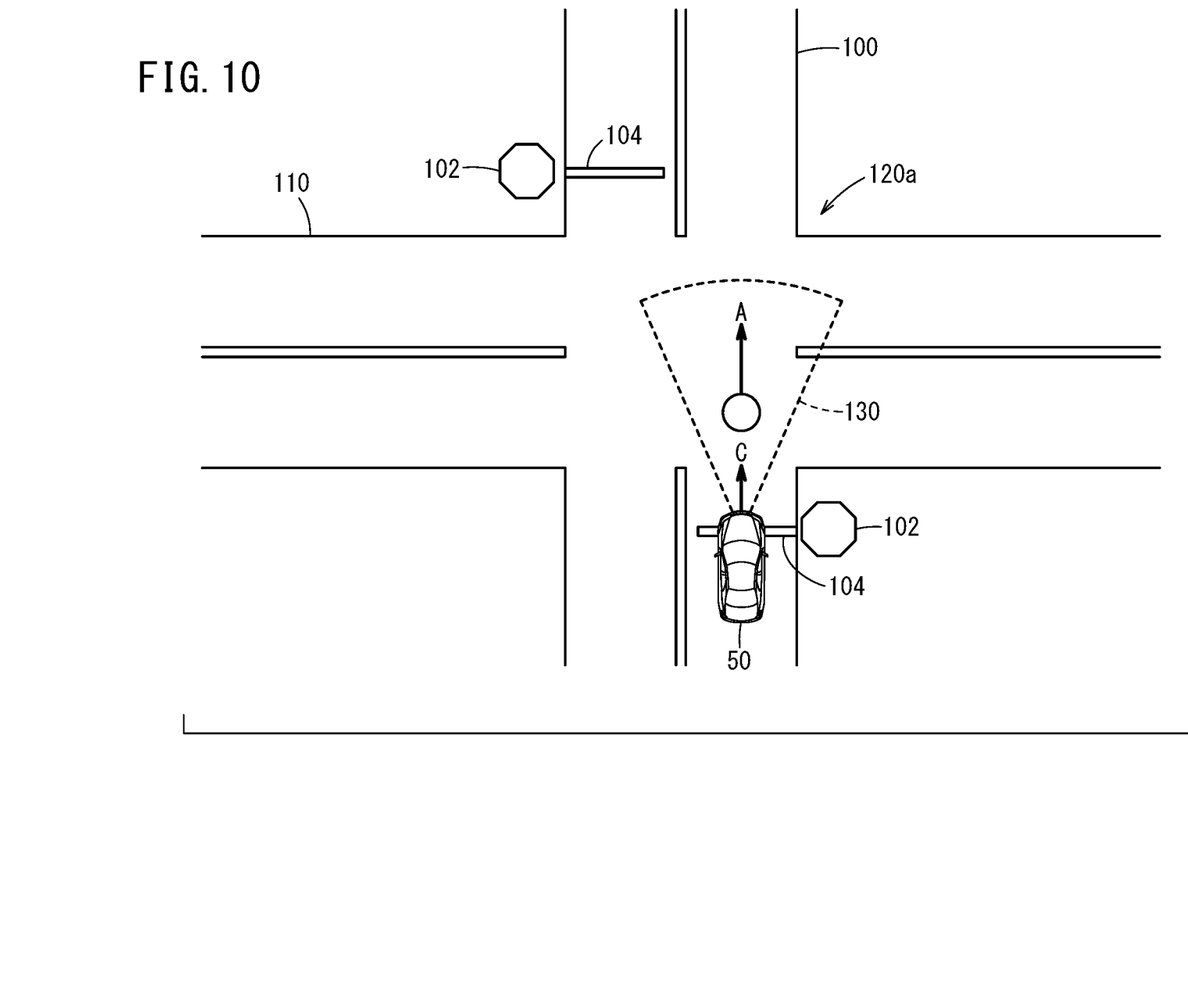
FIG. 10 is an illustration for describing a process to search for a specific intersection.

At step S21, the driving assistance unit 32 searches for any specific intersection 120a present in a search area 130 (FIG. 10) ahead of the host vehicle 50. In a similar manner to step S1 in FIG. 3, the trajectory information acquiring unit 28 obtains information output by the vehicle sensors 12 or information output by the GPS module 22, and calculates the position of the host vehicle 50. As shown in FIG. 10, the driving assistance unit 32 searches for any specific intersection 120a included in the search area 130 being within a predetermined distance of the host vehicle 50 and extending laterally about the direction in which the host vehicle 50 is traveling, based on information from the storage unit 34.

If there is a specific intersection 120a (step S22: YES), the process proceeds to step S23. On the other hand, if there is not a specific intersection 120a (step S22: NO), the driving assistance process ends once.

When proceeding to step S23 from step S22, it is determined whether a direction of entry C relative to the specific intersection 120a is the same as the direction of entry A at the time of registration or not. The driving assistance unit 32 regards the latest direction in which the host vehicle 50 is traveling as the direction of entry C, and calculates the absolute value |θ2| of the difference between the direction of entry C and the direction of entry A associated with the latitude and longitude of the specific intersection 120a in the storage unit 34 (hereinafter referred to as direction difference θ2). Then, if the absolute value |θ2| of the direction difference θ2 is equal to or less than a predetermined threshold θ2th, the driving assistance unit 32 presumes that the direction of entry C of the host vehicle 50 relative to the specific intersection 120a is the same as the direction of entry A at the time of registration (step S23: YES). In this case, the process proceeds to step S24. On the other hand, if the absolute value |θ2| of the direction difference θ2 is greater than the predetermined threshold θ2th, the driving assistance unit 32 presumes that the direction of entry C of the host vehicle 50 relative to the specific intersection 120a is different from the direction of entry A at the time of registration (step S23: NO). In this case, the driving assistance process ends once.

When proceeding to step S24 from step S23, the driving assistance unit 32 performs driving assistance. In this example, the driving assistance unit 32 outputs an instruction for driving assistance to the notification device 40 at a point when the host vehicle 50 has entered a predetermined area referenced to the specific intersection 120a, for example, at a point when the distance between the host vehicle 50 and the specific intersection 120a has become equal to or less than a predetermined distance. The notification device 40 notifies the driver that the first travel path 100 being traveled by the host vehicle 50 is of lower priority, via display, sound, haptic sense, and the like.

[3. Variations]

(1) Variation 1

The above-described embodiment does not consider an intersection 120 with traffic lights installed. An intersection 120 with traffic lights installed may be handled in the following manner. In a case where traffic lights are installed at the intersection 120 and when the traffic light for the first travel path 100 is indicating a stop signal and the traffic light for the second travel path 110 is indicating a progress permitting signal, the driver stops the host vehicle 50 at the intersection 120. If the conditions shown in FIGS. 3 and 4 are satisfied here, the intersection registering unit 30 registers this intersection 120 in the storage unit 34 as the specific intersection 120a. Next, when the traffic light for the first travel path 100 is indicating a progress permitting signal and the traffic light for the second travel path 110 is indicating a stop signal while the host vehicle 50 is traveling on the first travel path 100 and going to pass through the specific intersection 120a, the driver passes through the intersection 120 without stopping the host vehicle 50 there. Based on this behavior, the intersection registering unit 30 deletes the intersection information relating to the specific intersection 120a registered in the storage unit 34.

In Variation 1, instead of deleting intersection information, the intersection registering unit 30 may add information indicative of not being the specific intersection 120a to intersection information. In that case, during driving assistance, the driving assistance unit 32 will ignore any intersection information with information indicative of not being the specific intersection 120a.

(2) Variation 2

In the above embodiment, an intersection 120 where the host vehicle 50 gave way to the other vehicle 60 is regarded as the specific intersection 120a, and the latitude and longitude or the like of the specific intersection 120a are registered in the storage unit 34. Alternatively, intersection information for an intersection 120 other than the specific intersection 120a may also be registered in the intersection registration process, and identification information may be added for the specific intersection 120*a*. In that case, in the driving assistance process, the driving assistance unit 32 will search for any intersection information with such identification information.

(3) Variation 3

In the above embodiment, the driver is notified at the specific intersection 120*a* that the first travel path 100 being traveled by the host vehicle 50 is of lower priority during driving assistance. Aside from this, other kind of driving assistance may be performed at an intersection 120 other than the specific intersection 120*a*. That is, driving assistance may be performed both at the specific intersection 120*a* and an intersection 120 other than the specific intersection 120*a*, but with a difference in the level of driving assistance. Here, the driving assistance at the specific intersection 120*a* is performed at a higher level than the driving assistance at an intersection 120 other than the specific intersection 120*a*.

Variation 3 is described below. The driving assistance unit 32 outputs an instruction to the notification device 40 for giving a notification (low assistance level) in a case where the host vehicle 50 is to enter an intersection which is not the specific intersection 120*a* and the host vehicle 50 and the other vehicle 60 enter the intersection almost simultaneously (the difference in their expected times of entry is within a predetermined time period). By contrast, the driving assistance unit 32 outputs an instruction to the notification device 40 for giving an alert (high assistance level) in a case where the host vehicle 50 is traveling on the first travel path 100 and is going to enter the specific intersection 120*a* and if the host vehicle 50 and the other vehicle 60 enter the specific intersection 120*a* almost simultaneously (i.e., the difference in their expected times of entry is within a predetermined time period).

For example, when giving a notification, the driving assistance unit 32 causes a message indicating the presence of an approaching vehicle to appear on the display device. When giving an alert, the driving assistance unit 32 causes a message indicating the presence of an approaching vehicle to appear on the display device and an alerting sound to be generated on the sound device. Instead of an alerting sound, the haptic device (the steering wheel, a seat, and the like) may be vibrated. Alternatively, all of the display device, the audio device, and the haptic device may be activated.

It is also possible to vary the level of assistance performed by the single notification device 40. For example, the driving assistance unit 32 makes the message for display on the display device at the time of alert larger than the message for display on the display device at the time of notification.

The level of assistance may also be varied by varying the content of notification. For example, when giving a notification, the driving assistance unit 32 causes a message indicating the presence of an approaching vehicle to appear on the display device. At the time of alerting, the driving assistance unit 32 causes a message urging the driver to manipulate the brake to be appear on the display device, in addition to the message indicating the presence of an approaching vehicle.

(4) Variation 4

In the above embodiment, the driving assistance unit 32 outputs a driving assistance instruction to the notification device 40; however, it may output an assistance instruction to the braking device 42. In that case, the braking device 42 would perform deceleration assistance.

(5) Variation 5

It can happen that the direction of entry B of the host vehicle 50 relative to the specific intersection 120*a* is different from the registered direction of entry A by approximately 180 degrees during driving assistance. In this case, the host vehicle 50 would be traveling on the first travel path 100 in the opposite direction to that when the specific intersection 120*a* was registered, and be going to enter the specific intersection 120*a* from the opposite direction. Also in this case, the priority of the second travel path 110 is higher and the priority of the first travel path 100 is lower. Accordingly, 180 degrees may be added to the direction of entry B, after which the direction difference $\theta 2$ relative to the direction of entry A is calculated and the absolute value $|\theta 2|$ is calculated.

[4. Summary of the Embodiment]

The driving assistance apparatus 10 includes: the trajectory information acquiring unit 28 configured to obtain host-vehicle trajectory information indicative of a host vehicle's traveled trajectory which has been traveled by a host vehicle 50 and other-vehicle trajectory information indicative of another vehicle's traveled trajectory which has been traveled by the other vehicle 60; the intersection registering unit 30 configured to monitor the host vehicle's traveled trajectory and the other vehicle's traveled trajectory based on the host-vehicle trajectory information and on the other-vehicle trajectory information, and register in the storage unit 34, position information of an intersection 120 at which the host vehicle's traveled trajectory and the other vehicle's traveled trajectory intersect; and the driving assistance unit 32 configured to perform driving assistance for the host vehicle 50 in a predetermined area near the intersection 120 when the host vehicle 50 is to pass through the intersection 120 registered in the storage unit 34. The intersection registering unit 30 is configured to register in the storage unit 34 as a specific intersection 120*a*, an intersection 120 which the host vehicle 50 passes through after the other vehicle 60 has passed through. The driving assistance unit 32 is configured to make the level of driving assistance performed in the predetermined area near the specific intersection 120*a* higher than the level of driving assistance performed in the predetermined area near another intersection 120.

By registering an intersection 120 which the host vehicle 50 passes through after the other vehicle 60 has passed through as the specific intersection 120*a* as in the above configuration, it becomes possible to determine the relation of priority at the intersection 120. For example, when the host vehicle 50 is to pass through this intersection 120 after the registration of the intersection 120, the priority of the second travel path 110, which the other vehicle 60 passed through at registration, can be determined to be higher than the priority of the first travel path 100, which the host vehicle 50 passed through. Then, by varying the level of driving assistance in accordance with the priority of the travel path, the level of driving assistance can be made high when the priority is low and made low when the priority is high. As a result, no more driving assistance than necessary is performed in a situation where the priority is high and driving assistance is not required, preventing the driver from feeling frustrated.

The driving assistance unit 32 is configured to determine the direction of entry C of the host vehicle 50 relative to the specific intersection 120*a* when the host vehicle 50 passes through the specific intersection 120*a* after the registration of the specific intersection 120*a*, and when the determined direction of entry C is the same as the direction of entry A at the time of registration of the specific intersection 120*a*, the driving assistance unit 32 is configured to make the level of driving assistance performed in the predetermined area near the specific intersection 120a higher than the level of driving assistance performed in the predetermined area near the other intersection 120.

By considering the direction of entry at the time of registration and that at the time of driving assistance as in the above configuration, driving assistance can be performed in an appropriate scene.

The intersection registering unit 30 is configured to calculate a candidate point 122 for the specific intersection 120a based on the travel vector V1 of the host vehicle 50 and on the travel vector V2 of the other vehicle 60, and identify the candidate point 122 as the specific intersection 120a when the intersection registering unit 30 is configured to presume that both of the host vehicle's traveled trajectory and the other vehicle's traveled trajectory have passed through the candidate point 122.

Such pre-calculation of the candidate point 122 for the specific intersection 120a as in the above configuration eliminates the necessity to monitor traveled trajectories when there is no candidate point 122. By not always performing the monitoring of traveled trajectories, processing load can be reduced.

The intersection registering unit 30 is configured to set the passage zone 124 including the candidate point 122, and presume that either the host vehicle 50 or the other vehicle 60 has passed through the candidate point 122 if it is determined that either the host vehicle's traveled trajectory or the other vehicle's traveled trajectory has entered and exited the passage zone 124 and if it is determined that the direction difference $\theta1$ (the absolute value $|\theta1|$) between the direction when either the host vehicle 50 or the other vehicle 60 entered the passage zone 124 and the direction when it exited the passage zone 124 is equal to or less than the predetermined threshold $\theta1th$.

By presuming that the vehicle (the host vehicle 50 or the other vehicle 60) has passed through the candidate point 122 if the direction difference $\theta1$(the absolute value $|\theta1|$) between the direction when the vehicle entered the passage zone 124 and the direction when it exited the passage zone 124 is equal to or less than the predetermined threshold $\theta1th$ as in the above configuration, whether the vehicle has passed through the candidate point 122 or not can be determined simply and appropriately.

When an activation of the direction indicator 44 at either the host vehicle 50 or the other vehicle 60 is detected, the intersection registering unit 30 is configured to make the threshold $\theta1th$ greater than that when an activation of the direction indicator 44 is not detected.

By making the threshold $\theta1th$ greater when the direction indicator 44 is activated as in the above configuration, whether the vehicle (the host vehicle 50 or the other vehicle 60) has passed through the candidate point 122 with a right/left turn can be determined appropriately.

The intersection registering unit 30 is configured to register in the storage unit 34 as a specific intersection 120a, an intersection 120 which the host vehicle 50 passes through within the predetermined time period T2th after the other vehicle 60 has passed through.

By limiting the elapsed time T2 from when the other vehicle 60 passes through the intersection 120 to when the host vehicle 50 passes through the same to within the predetermined time period T2th as in the above configuration, a scene where the host vehicle 50 gave way to the other vehicle 60 can be extracted correctly. This can increase the reliability of specific intersections 120a to be registered.

It will be apparent that the driving assistance apparatus according to the present invention is not limited to the above embodiment but may adopt various other configurations without departing from the gist of the present invention.

What is claimed is:

1. A driving assistance apparatus comprising:
    a trajectory information acquiring unit configured to obtain host-vehicle trajectory information indicative of a host vehicle's traveled trajectory which has been traveled by a host vehicle and other-vehicle trajectory information indicative of another vehicle's traveled trajectory which has been traveled by the other vehicle;
    an intersection registering unit configured to monitor the host vehicle's traveled trajectory and the other vehicle's traveled trajectory based on the host-vehicle trajectory information and on the other-vehicle trajectory information, and register in a storage unit, position information of an intersection at which the host vehicle's traveled trajectory and the other vehicle's traveled trajectory intersect; and
    a driving assistance unit configured to perform driving assistance for the host vehicle in a predetermined area near the intersection when the host vehicle is to pass through the intersection registered in the storage unit,
    wherein the driving assistance apparatus is mounted on the host vehicle,
    the intersection registering unit is configured to register in the storage unit as a specific intersection, an intersection which the host vehicle passes through after the other vehicle has passed through, and
    the driving assistance unit is configured to determine a direction of entry of the host vehicle relative to the specific intersection when the host vehicle passes through the specific intersection after the registration of the specific intersection, and when a difference between the determined direction of entry and the direction of entry at a time of registration of the specific intersection is equal to or less than a predetermined threshold, the driving assistance unit is configured to make a level of driving assistance performed in the predetermined area near the specific intersection higher than the level of driving assistance performed in the predetermined area near another intersection.

2. The driving assistance apparatus according to claim 1, wherein the intersection registering unit is configured to calculate a candidate point for the specific intersection based on a travel vector of the host vehicle and on a travel vector of the other vehicle, and identify the candidate point as the specific intersection when the intersection registering unit presumes that both of the host vehicle's traveled trajectory and the other vehicle's traveled trajectory have passed through the candidate point.

3. The driving assistance apparatus according to claim 2, wherein the intersection registering unit is configured to set a passage zone including the candidate point, and presume that either the host vehicle or the other vehicle has passed through the candidate point in a case where it is determined that either the host vehicle's traveled trajectory or the other vehicle's traveled trajectory has entered and exited the passage zone, and where it is determined that a direction difference between the direction when either the host vehicle or the other vehicle entered the passage zone and the direction when exited the passage zone is equal to or less than the predetermined threshold.

4. The driving assistance apparatus according to claim 3, wherein when an activation of a direction indicator at either the host vehicle or the other vehicle is detected, the intersection registering unit is configured to make the threshold greater than that when an activation of the direction indicator is not detected.

5. The driving assistance apparatus according to claim 1, wherein the intersection registering unit is configured to register in the storage unit as the specific intersection, an intersection which the host vehicle passes through within a predetermined time period after the other vehicle has passed through.

* * * * *